(12) United States Patent
Kida et al.

(10) Patent No.: US 6,323,908 B1
(45) Date of Patent: Nov. 27, 2001

(54) DIGITAL BROADCAST RECEIVER OUTPUTTING VIDEO AND PROGRAM INFORMATION

(75) Inventors: Takayuki Kida, Higashiosaka; Nobuhiro Hara, Hirakata, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/197,469

(22) Filed: Nov. 23, 1998

(30) Foreign Application Priority Data

Nov. 26, 1997 (JP) ................................. 9-324020

(51) Int. Cl.[7] .................................................. H04N 7/00
(52) U.S. Cl. ................................. 348/460; 386/83; 725/58
(58) Field of Search ................................. 348/460, 553, 348/552, 906, 564, 569, 563; 382/42, 55, 46, 65; 725/58; 386/83

(56) References Cited

U.S. PATENT DOCUMENTS 5,253,066 * 10/1993 Vogel .................................... 358/188
5,751,335 * 5/1998 Shintani ................................. 348/5.5
5,754,651 * 5/1998 Blatter et al. ........................... 380/20

FOREIGN PATENT DOCUMENTS

0843468A2    5/1998   (EP) .
WO98/57493   12/1998   (WO) .

* cited by examiner

Primary Examiner—Victor R. Kostak
(74) Attorney, Agent, or Firm—Arent Fox Kintner Plotkin & Kahn PLLC (57) ABSTRACT

A digital broadcast receiver includes a CPU. The CPU starts a VTR several ten seconds before a broadcast start time for a reserved program, to set a video recording mode. Simultaneously, program information for the reserved program is outputted to the VTR. When the broadcast start time comes, the CPU stops the outputting of the program information, and outputs a video and audio signal for the reserved program to the VTR. Accordingly, a video cassette is first recorded with the program information, and then video-recorded with the reserved program.

6 Claims, 6 Drawing Sheets

DIGITAL BROADCAST RECEIVER OUTPUTTING VIDEO AND PROGRAM INFORMATION

BACKGROUND OF THE INVENTION

1. Field of the Invention

This invention relates to digital broadcast receivers. More particularly, the invention relates to a digital broadcast receiver adapted to output video signals for a desired broadcast program contained in digital signals to a video recording means.

2. Description of the Prior Art

There has been a conventional digital broadcast receiver of this kind which operates to start a VTR simultaneously with a start of a desired broadcast program, so as to output a program video and audio signal to the VTR.

However, where viewing a filmed program, it is not easy to grasp a content of the program, differently from a case of viewing a program in real time. That is, the digital broadcast signal contain EPG (Electronic Program Guide) data and program information data indicative of a concrete content of a program. Accordingly, when viewing a realtime program, the content of a program is easy to recognize through displaying the data on the screen. On the contrary, the VTR-reproduced signal contain only a video and audio signal for a program. It is therefore difficult to grasp a content of the program without reproducing program data to a certain extent.

SUMMARY OF THE INVENTION

Therefore, it is a primary object of this invention to provide a digital broadcast receiver which makes it possible to readily grasp a content of a filmed program.

According to the present invention, a digital broadcast receiver, comprises: an extracting means which extracts a video signal for a desired program from a digital broadcast signal; a generating means which generates program information for the desired program; a selective output means which selectively outputs the video signal and the program information to a video recording means; and an instructing means which instructs said video recording means to effect video recording simultaneously with an output from said selective output means.

The extracting means extracts a desired-program video signal out of a digital broadcast signal, and the generating means generates a desired-program program information. The selective output means selectively outputs the video signal extracted by the extracting means and the program information generated by the generating means. Also, the instructing means instructs the video recording means to perform video recording simultaneously with the output from the selective output means.

In one aspect of the present invention, an information amount detecting means detects an information amount of the program information, and a program information generating means generates the program information for a first predetermined time period corresponding at least to the information amount.

In one embodiment of the present invention, the information amount detected is expressed by the number of pages, and said program information generating means including a renewing means which renews a page at every second predetermined time period that is shorter than the first predetermined time period.

In another embodiment of the present invention, said generating means further includes a timing detecting means which detects timing that is prior to a broadcast start time for the desired program and associated with the first predetermined time period. An enabling means enables said program information generating means at timing detected by said timing detecting means.

In still another embodiment of the present invention, said generating means further includes a program information detecting means, and the program information detecting means detects the program information from the digital broadcast signal.

In another aspect of the present invention, an audio signal extracting means extracts an audio signal for the desired program from the digital broadcast signal. An audio signal output means outputs the audio signal to said video recording means simultaneously with an output of the video signal.

In another aspect of the present invention, the desired program is a reserved program.

According to the present invention, because program information is outputted to the video recording means, the content of a program can be easily recognized during reproduction. More specifically, a reserved program is video-recorded together with its program information by beginning video recording prior to a start of the program. This serves to readily remind the viewer of the reserved program content.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
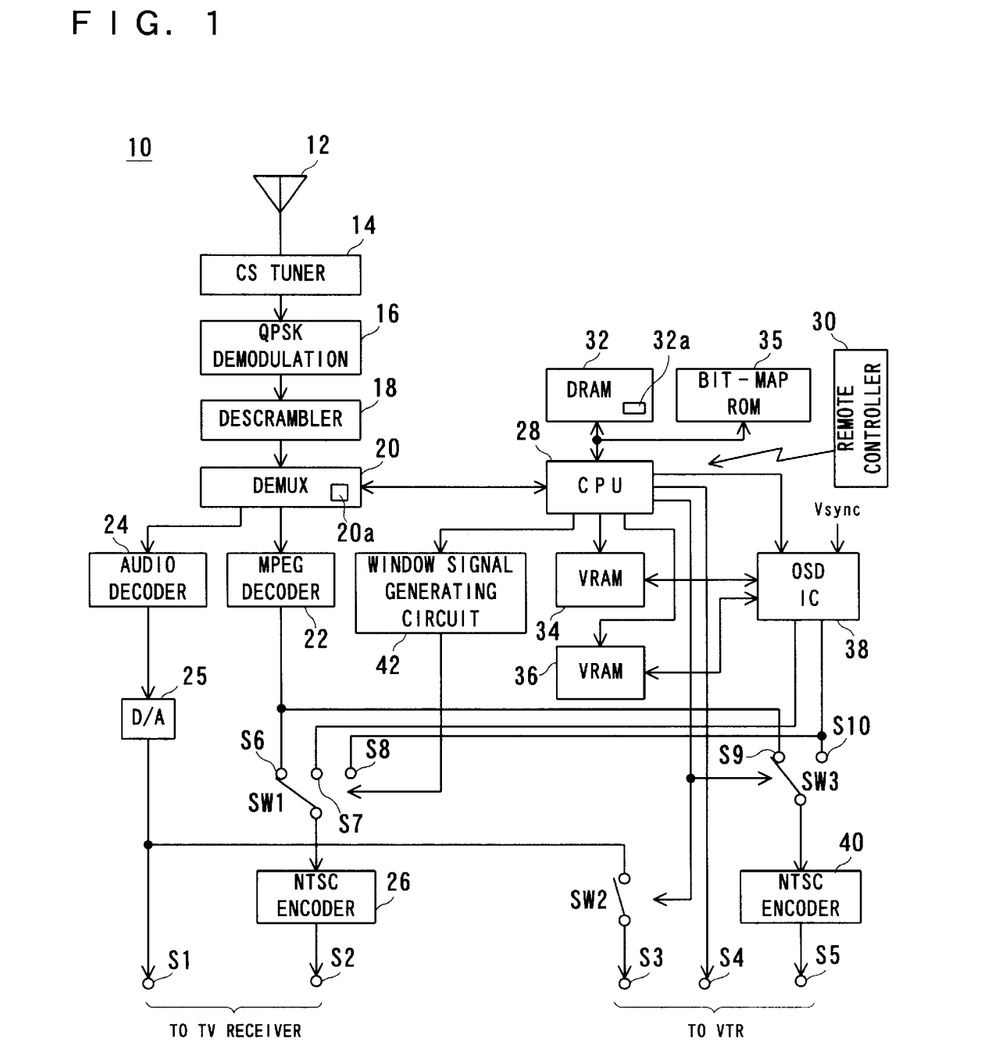
FIG. 1 is a block diagram showing one embodiment of the present invention.

Referring to FIG. 1, a digital broadcast receiver 10 in this embodiment includes an antenna 12 for receiving digital broadcast outputted from a communication satellite. A digital broadcast signal received by this antenna 12 is supplied to a CS tuner 14. The CS tuner 14 selects 4–8 channels of broadcast data outputted from a desired transponder. That is, because in CS broadcast one transponder outputs 4–8 channels of broadcast data, the CS tuner 14 selects a transponder including a desired channel. The selected broadcast data is demodulated by a QPSK demodulating circuit 16 into a transport stream comprising a plurality of transport packets for the 4–8 channels.

A descrambler 18 supplies only a transport packet through a channel under subscription by a receipient to a demultiplexer 20. The demultiplexer 20 in turn detects a desired channel packet out of the inputted packets. The demultiplexer 20 supplies the packet containing a video component to an MPEG decoder 22 and the packet containing a audio component to an audio decoder 24. The MPEG decoder 22 performs decoding on the inputted packet, and inputs the decoded video data to an NTSC encoder 26 through a switch SW1. The NTSC encoder 26 creates a composite video signal (analog signal) of an NTSC format. The created composite video signal is outputted to a television receiver (not shown) through a terminal S2. On the other hand, the audio decoder 24 performs decoding on the inputted packet to create audio data. The audio data is outputted through a D/A converter 25 and a terminal S1 to the television receiver.

Figure 2:
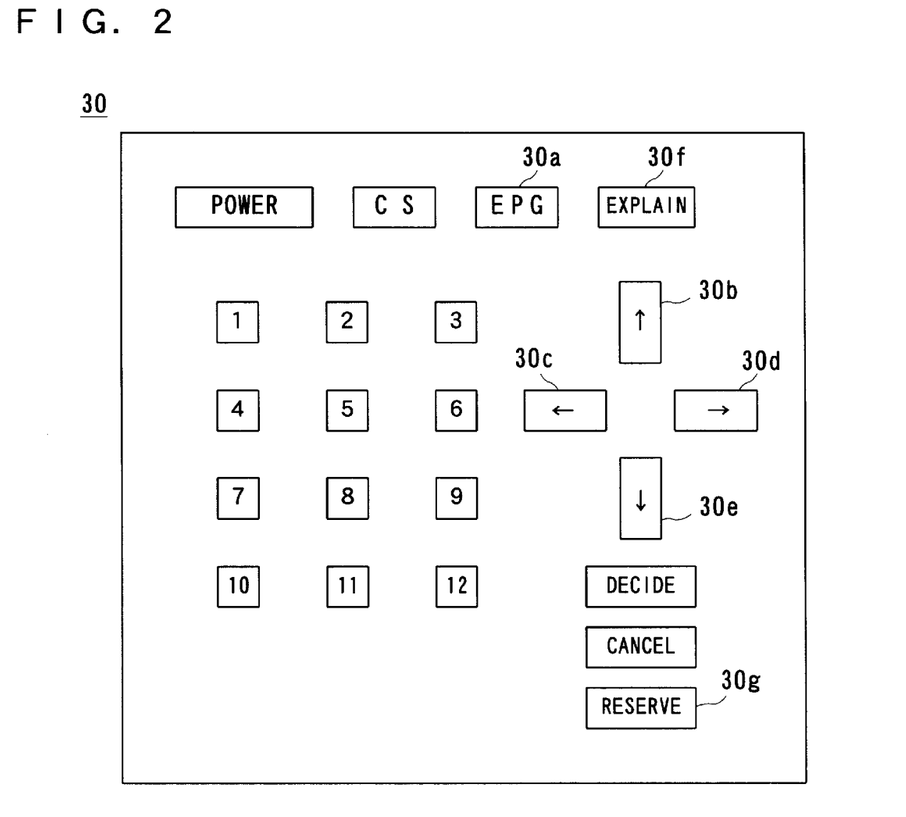
FIG. 2 is an illustrative view showing a remote controller.

The transport packet is partly assigned with PSI (Program Specific Information), wherein the PSI contains an EIT (Event Information Table). A CPU 28 makes reference to this EIT to extract three-hour EPG data through three channels including a current channel from the transport packet, and creates bit-map data for a program guide with using a bit-map ROM 32. The program guide bit-map data is stored in a VRAM 34. A remote controller 30 is structured as shown in FIG. 2. If an operator depresses an EPG button 30a on the remote controller 30, then an on-screen display IC 38 reads the program guide bit-map data out of the VRAM 34 responsive to a vertical synchronizing signal. The program guide bit-map data is supplied onto a terminal S7.

On the other hand, if an explain button 30f on the remote controller 30 is depressed, the CPU 28 detects program information data of a program now being received, i.e. a program name, broadcast start time, broadcast end time and program outline data, from the EIT, and stores the bit-map data for the program information into the VRAM 36. The IC 38 reads out the program information bit-map data from the VRAM 36 responsive to a vertical synchronizing signal, and supplies it onto a terminal S8.

A window signal generating circuit 42 outputs a window signal representative of a display area for the program guide when the program guide bit-map data is outputted from the IC 38. At this time, the switch SW1 is brought into connection to the terminal S7, so that the program guide bit-map data is inputted to the NTSC encoder 26. Also the window signal generating circuit 42 outputs the window signal representative of display area for the program information when the program information bit-map data is outputted from the IC 38. This causes the switch SW1 to be connected to the terminal S8. Accordingly, the program information bit-map data is inputted to the NTSC encoder 26.

In a state that a program guide is being displayed on a monitor of the television receiver, if the operator operates cursor keys 30b–30e to position a cursor onto a desired program and then depresses a reserve button 30g, then a video-decoding reservation process for the program is executed. That is, the CPU 28 holds, in the DRAM 32, reserved-program broadcast start time data, broadcast end time data and broadcast channel data. The CPU 28 also detects reserved-program outline data from the EIT, and detects the number of characters for the program outline.

Figure 3:
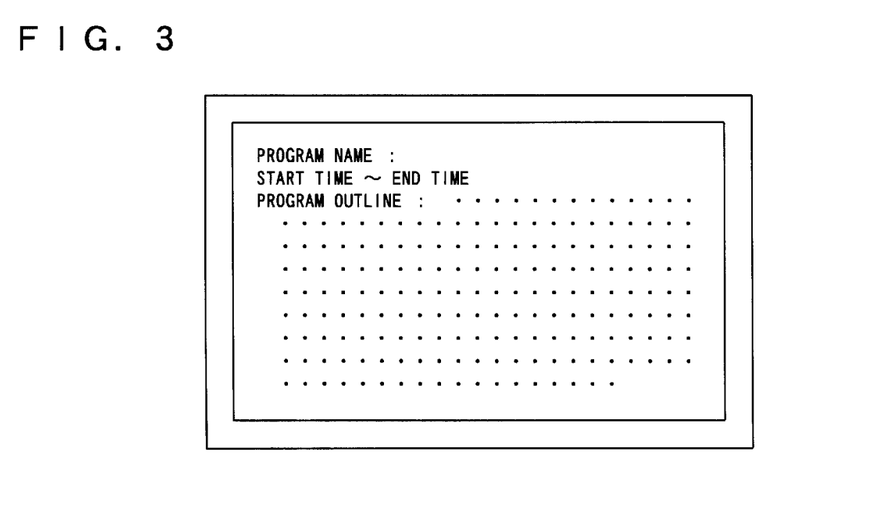
FIG. 3 is an illustrative view showing one part of operation of the FIG. 1 embodiment.

On the television receiver monitor, program information, including a program name, broadcast start time, broadcast end time and program outline, is displayed in a manner as shown in FIG. 3. However, only 200 characters at maximum can be displayed, at one time, for a program outline. Due to this, the CPU 28 calculates the number of pages required for display, and determines a time period for outputting the program information bit-map data according to the calculated number of pages. The output time period is (the number of pages×10+α) seconds, and this output time data is held within the DRAM 32. Incidentally, α seconds is provided due to consideration of a time period required for tuning to a reserved program, and set for example at 0.5 second.

It becomes (the number of pages×10+α) seconds before starting a broadcast of the reserved program, the CPU 28 outputs a video record command to a VTR through the terminal S4. This places the VTR in a video record mode. Also the IC38 reads out the program information bit-map data, including the reserved program name, broadcast start time, broadcast end time and first-page program outline. At this time, the switch SW3 is connected to the terminal S10 so that the bit-map data is outputted to the VTR through the NTSC encoder 40.

When 10 seconds has been elapsed, the program outline stored in the VRAM 36 is renewed to a next page. The IC 38 is continuously reading data out of the VRAM 36. This causes the program information bit-map to be outputted to be renewed of only its program outline. In this manner, the program information bit-map data stored in the VRAM 36 is renewed, page by page, every 10 seconds. At a program broadcast start time, all the program outlines have been outputted. Immediately after this, the switch SW3 is brought into connection to the terminal S9 and the switch SW2 is turned on to thereby output served-program video and audio signals to the VTR. That is, the video recording for the reserved program is started.

Figure 4:
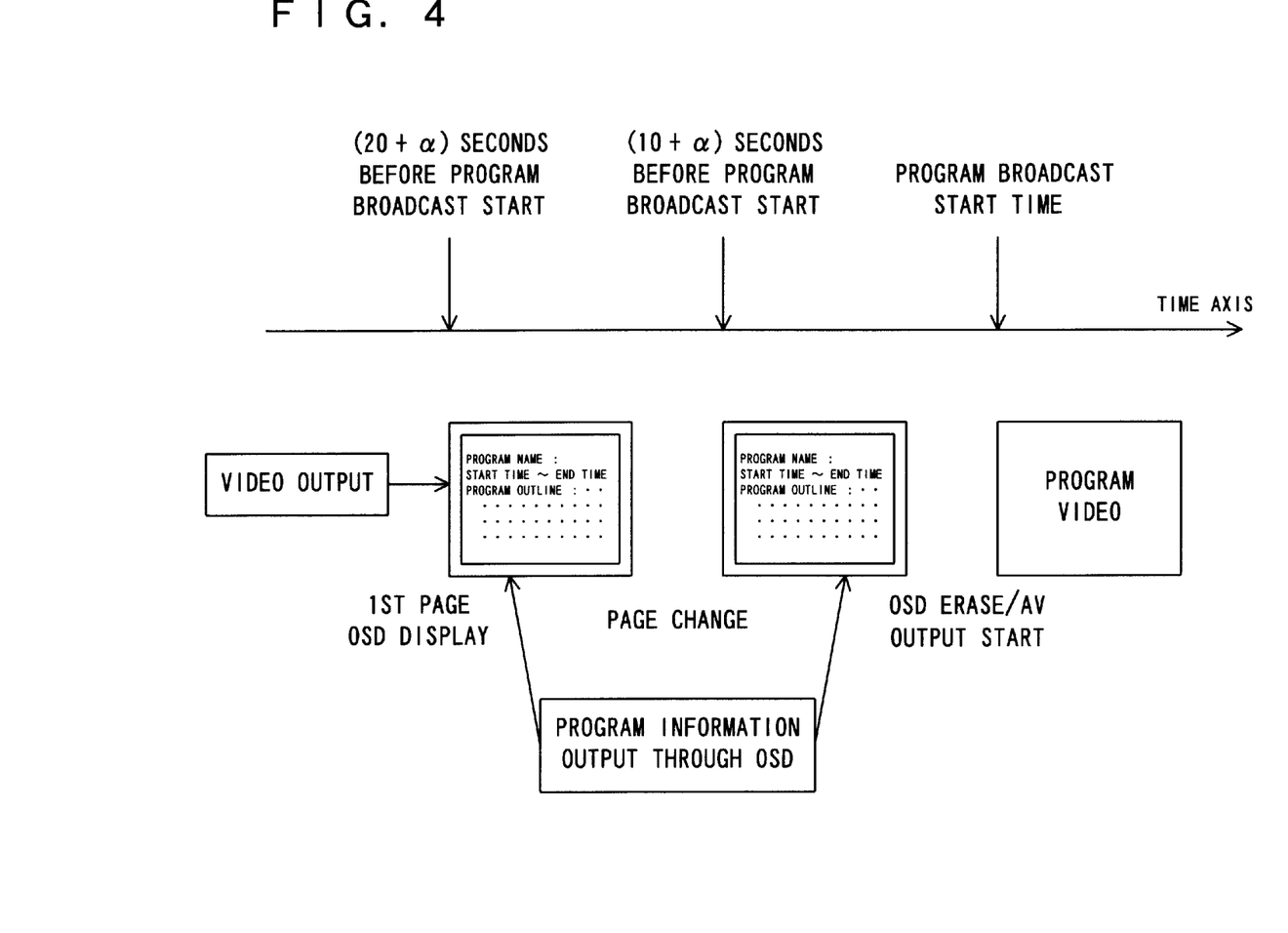
FIG. 4 is a flowchart showing an interrupt routine of a CPU.

In an example of FIG. 4, the program information has an information amount of two pages. At a time point of (20+α) seconds before starting to broadcast the reserved program, the program information for a first page is first outputted to the VTR, and page renewal is made at a time point that 10 seconds are elapsed from the output start. When it is at a program broadcast time, the program information output is suspended and, instead, the reserved-program video and audio signals are outputted to VTR.

Prior to broadcasting a reserved program, the program information for the reserved program is outputted to the VTR in the above-stated manner. Further, the VTR is controlled such that video recording is started from a program information output start time. Due to this, the program information is recorded on a video cassette, thus making it easy to grasp a content of the program during reproduction.

Figure 5:
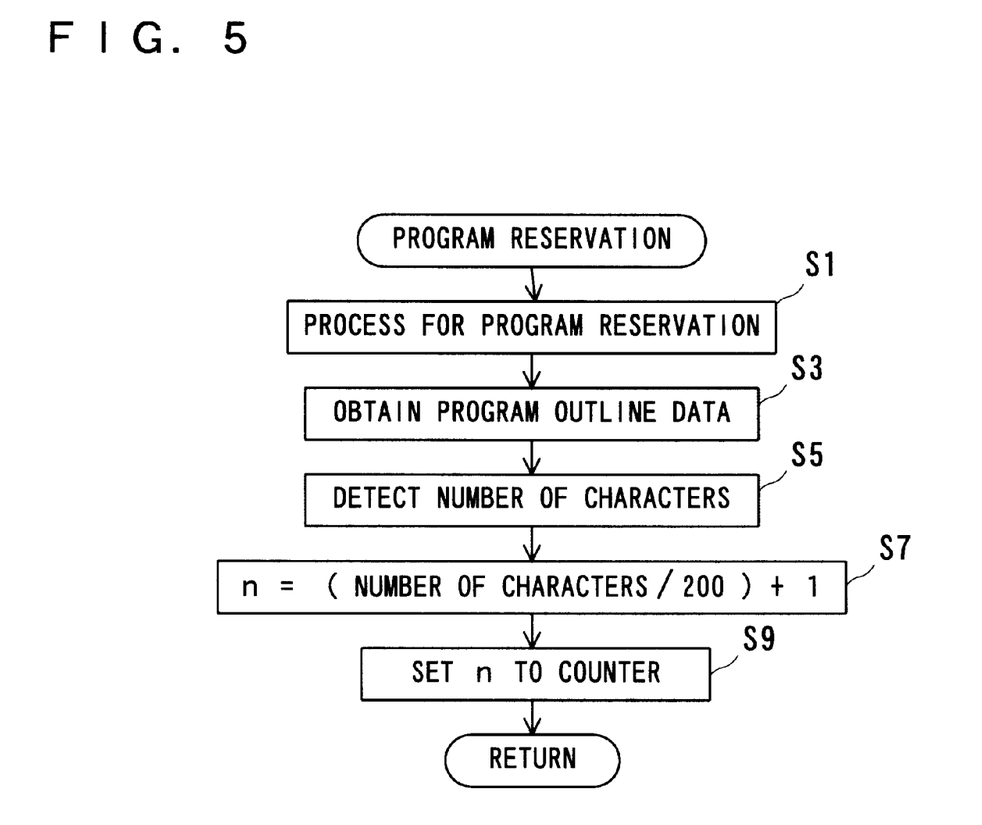
FIG. 5 is a flowchart showing one part of a main routine of the CPU.
Figure 6:
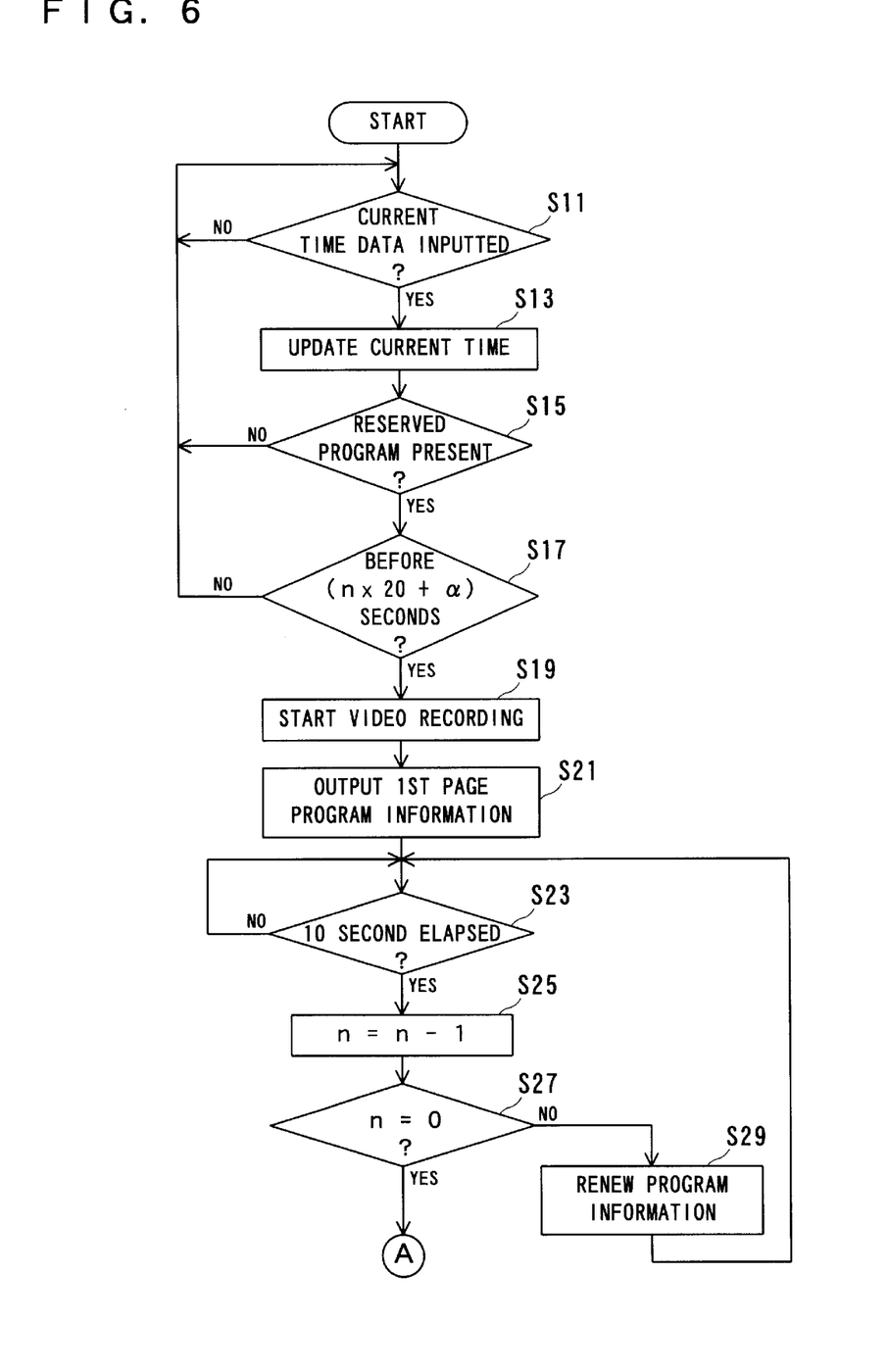
FIG. 6 is a flowchart showing another part of the main routine of the CPU.
Figure 7:
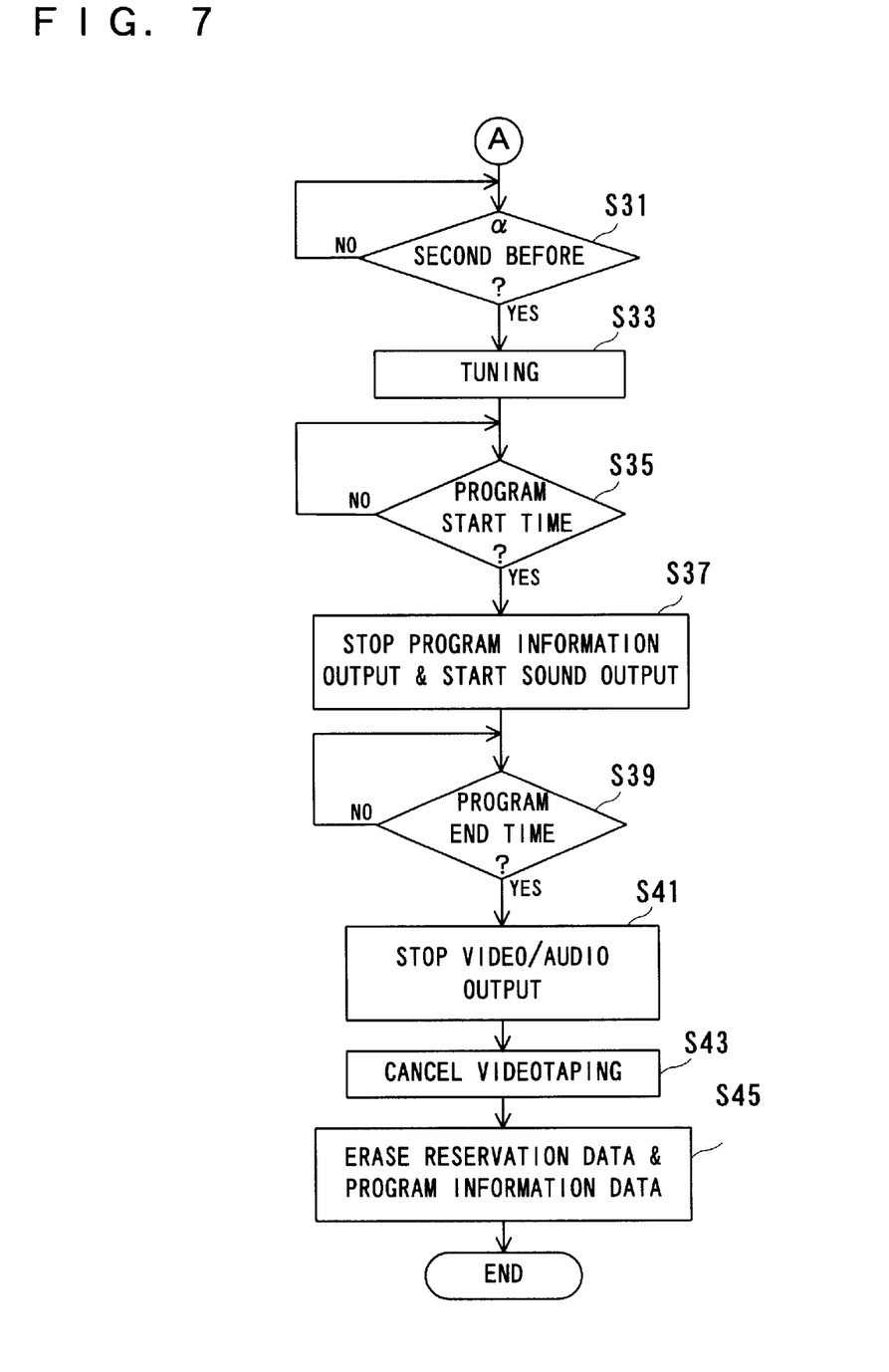
FIG. 7 is a flowchart showing still another part of the main routine of the CPU.

The CPU 28 executes a main routine shown in FIGS. 6 and 7, and an interrupt routine shown in FIG. 5. Given with a program reserve signal from the remote controller 30, the CPU starts the process of the interrupt routine shown in FIG. 5. At a step S1, a program reserve process is carried out. That is, the data of a program broadcast start time, broadcast and time and broadcast channel, is stored into the DRAM 32. Then the CPU 28 at a step S3 obtains the program outline data for a reserved program from the EIT, and detects the number of characters required to display a program outline. As stated before, the number of characters for a program outline to be displayed at one time on a television receiver monitor is 200 at a maximum. Accordingly, CPU 28 processes with Equation 1 at a step S7 to calculate the number of pages n required to display the program information. Incidentally, a decimal fraction of numeral calculated is truncated.

$$n=(\text{the number of characters}/200)+1 \qquad [\text{Equation 1}]$$

The CPU 28 then sets, at a step S9, the number of pages n into a counter 32a, and then returns.

The CPU 28, as long as at least a stand-by power supply is on, makes processing on the main routine shown in FIGS.

6 and 7. That is, the CPU 28 at first determines, at a step S11, whether current time data has been inputted or not. If "YES", the current time is renewed. Because current time data is sent from the communication satellite every 1 second, the current time is renewed by the processes at the steps S11 and S13. Subsequently the CPU 28 at a step S15 makes reference to the DRAM 32 to determine whether there is a reserved program or not. If "NO", the process returns to the step S11, while if "YES", it is determined at a step S17 whether the current time is before (n×20+α) seconds from a reserved program broadcast start time or not. If "NO" here, the process returns to the step S11. However, if "YES", the process advances to a step S19.

At the step S19, the CPU 28 outputs a video record command to the VTR through the terminal S4, to cause the VTR to start video recording. Then at a step S21 the program information bit-map data for a first page is stored into the VRAM 36, and a command for reading from the VRAM 36 is given to the IC 38 and the switch SW3 is placed into connection to the terminal S10. Incidentally, the switch SW2 at this time is off. Due to this, the first page program information bit-map data is supplied from the IC 38 to the NTSC encoder 40, and it thereafter outputted to the VTR through the terminal S5.

It is determined at a step S23 whether 10 seconds have been elapsed from an output of the current page program information or not. If "YES", the counter 32a at a step S25 is decremented in its count value n. It is then determined at a step S27 whether the count value n is "0" or not. If "NO", the program information bit-map data stored in the VRAM 36 is renewed at a step S29. That is, the program outline in the VRAM 36 is changed from the current page to a next page. Incidentally, the IC 38 is continuously given by a command for reading the VRAM 36. The switch SW3 is kept in connection to the terminal S10, and the switch SW2 is held off. If the program information is renewed, the CPU 28 returns to the step S23 to repeat the above-stated processes.

At a time point that "YES" is determined at the step S27, (n×10) seconds have been passed after the start of the video decoding and it is now immediately before the reserved program broadcast start time. The CPU 28 determines at a step S31 whether the current time is before α seconds from the broadcast start time or not. If "YES", tuning to a broadcast channel is made for the reserved program at a step S33. It is thereafter determined at a step S35 whether the current time is at a reserved program broadcast start time or not. If "YES" here, at a step S37 the outputting the program information is stopped, to start outputting the reserved program video and audio signals. That is, the IC 38 is caused to stop reading the program information bit-map data, and the switch SW3 is brought into connection to the terminal S9 and the switch SW2 is turned on. This state is maintained during broadcasting the reserved program.

The CPU 28 determines at a step S39 whether the current time is at a program broadcast end time or not. If "YES", at a step S41 the video and audio signals is stopped to output, and video recording is cancelled at a step S43. That is, at the step S41 the switch SW2 is turned off and switch SW3 is brought into connection to the terminal S10. Also at the step S43 a video decoding cancel command is outputted through the terminal S4. At a step S45 erasure is made for the program broadcast start time data, broadcast and time data and broadcast channel data held within the DRAM 34 as well as the program information bit-map data stored within the VRAM 36, thus ending the process.

Incidentally, when it becomes several tens seconds before broadcasting a reserved program, the program information bit-map data for the reserved program is stored to the VRAM 36 as stated above. In the duration other than this time period, desired program information data is stored in the VRAM 36 in response to operation of the explain button 30f provided on the remote controller 30. That is, the operation of the explain button 30f is rendered ineffective while the program information data for a reserved program is stored in the VRAM 36. The program information responsive to the operation of the explanation button 30f is displayed only on the television receiver because the VTR will not effect video recording unless it receives a video record command and because the switch SW3 during program video recording is connected to the terminal S9. Further, a program guide is displayed only on the television receiver monitor in response to operation of the EPG button 30a because the program guide bit-map read out of the VRAM 34 is given only onto the terminal S7. Accordingly, even if the explain button 40f and the EPG button 30a are operated during video recording for a reserved program, there is no fear that the program information or program guide be unintentionally recorded.

Incidentally, in this embodiment explanation was made using a digital broadcast receiver in a single body form. However, the digital broadcast receiver may be incorporated in VTR, or in the television receiver.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcast receiver comprising:
   an extracting means which extracts a video signal for a desired program from a digital broadcast signal;
   a generating means which generates program information for the desired program;
   a selective output means which selectively outputs the video signal and the program information to a video recording means; and
   an instructing means which instructs said video recording means to effect video recording simultaneously with an output from said selective output means, wherein said generating means includes an information amount detecting means which detects an information amount of the program information, and a program information generating means which generates the program information only for a first predetermined time period corresponding to at least the information amount.

2. A digital broadcast receiver according to claim 1, wherein the information amount is expressed by the number of pages, and said program information generating means including a renewing means which renews a page at every second predetermined time period that is shorter than the first predetermined time period.

3. A digital broadcast receiver according to claim 1, wherein said generating means further includes a timing detecting means which detects timing that is prior to a broadcast start time for the desired program and associated with the first predetermined time period, and an enabling means which enables said program information generating means at timing detected by said timing detecting means.

4. A digital broadcast receiver according to claim 1, wherein said generating means further includes a program information detecting means which detects the program information from the digital broadcast signal.

5. A digital broadcast receiver according to claim 1, further comprising an audio signal extracting means which extracts an audio signal for the desired program from the digital broadcast signal, and an audio signal output means which outputs the audio signal to said video recording means simultaneously with an output of the video signal.

6. A digital broadcast receiver according to claim 1, wherein the desired program is a reserved program.

* * * * *